(12) United States Patent
Lee et al.

(10) Patent No.: US 6,442,516 B1
(45) Date of Patent: Aug. 27, 2002

(54) SOFTWARE TOOL TO PERFORM CONCURRENT NATIONAL LANGUAGE TRANSLATION BUILDS

(75) Inventors: Gary Wayne Lee, Austin; Mark Edward Nosewicz, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,924

(22) Filed: Jan. 29, 1999

(51) Int. Cl.7 .............................................. G06F 17/20
(52) U.S. Cl. ........................................................ 704/8
(58) Field of Search ..................... 704/1, 8, 9; 707/530, 707/536, 203; 717/1, 8

(56) References Cited

U.S. PATENT DOCUMENTS

| | | | | |
|---|---|---|---|---|
| 5,243,519 A | * | 9/1993 | Andrews et al. | 704/8 |
| 5,251,130 A | * | 10/1993 | Andrews et al. | 704/8 |
| 5,307,265 A | * | 4/1994 | Winans | 704/8 |
| 5,416,903 A | * | 5/1995 | Malcolm | 704/8 |
| 5,499,335 A | * | 3/1996 | Silver et al. | 704/8 |
| 5,583,761 A | * | 12/1996 | Chou | 704/8 |
| 5,664,206 A | * | 9/1997 | Murrow et al. | 704/8 |
| 5,675,818 A | * | 10/1997 | Kennedy | 704/8 |
| 5,678,039 A | * | 10/1997 | Hinks et al. | 704/8 |
| 5,729,744 A | * | 3/1998 | Gerken et al. | 395/619 |
| 5,734,899 A | * | 3/1998 | Yoshizawa et al. | 395/619 |
| 5,787,452 A | * | 7/1998 | McKenna | 707/536 |
| 5,900,871 A | * | 5/1999 | Atkin et al. | 345/334 |
| 5,907,326 A | * | 5/1999 | Atkin et al. | 345/334 |

OTHER PUBLICATIONS

NN9609107 "Automation of Program Integrated Information File Handling Process" IBM Technical Disclosure, vol. 39, Issue 9, pp. 107–110, Sep. 1996.*

NN9504209 "Automated/Restartable Software Build Process" IBM technical disclosure, Apr. 19995, pp. 209–210.*

* cited by examiner

Primary Examiner—Patrick N. Edouard
(74) Attorney, Agent, or Firm—Leslie A. Van Leeuwen; Bracewell & Patterson, L.L.P.

(57) ABSTRACT

A method to provide concurrent national language support builds in a second human language during development of a computer software in a first human language on a data processing system. The baselevel changes of the software in a first human language are tracked and stored in a library control database. At some point, a report of the baselevel changes is generated including a list of all newly created files in the first human language which have not been translated into the second human language and all translated files in the second human language which are downlevel. A real-time status of build process is provided to a developer of the computer software utilizing information from the library control database field. tracking all baselevel changes of said software in a first human language. The report is analyzed to give a real-time status of build to a developer of said computer software. The report permits the builder to decide whether of not to send the downlevel second language files to a national language center for translation.

24 Claims, 2 Drawing Sheets

SOFTWARE TOOL TO PERFORM CONCURRENT NATIONAL LANGUAGE TRANSLATION BUILDS

BACKGROUND OF THE INVENTION

1. Technical Field

The present invention relates in general to software applications, and in particular to a method and system for facilitating translations during the build process of software applications on a data processing system. Still more particularly, the present invention relates to a method and system for performing concurrent national language translations builds of software applications on a data processing system.

2. Description of the Related Art

The global nature of the world today has created an increased market for computer software applications which may be simply translated into a large number of foreign languages. Indeed, National Language Support (NLS) is increasingly important as the market for data processing systems is ever expanding. While the demands upon hardware systems are minimal for NLS needs are often solved by the provision of a small number of special keyboard characters, the large textual content of many software applications lead to a more difficult NLS problem.

The translation of a software application into a foreign language for utilizing a batch process wherein the text may be edited with a text editor. The resultant translation must then be verified with a simulation of the display screens of the software application or by executing the program after translation and building of the application have occurred. Additional changes brought about by variations induced due to the contextual nature of a text entry or as a result of simple size differences between a textual entry in two different languages must then be edited in the batch process and the verification program repeated.

NLS builds need to have concurrent product release dates. Before shipping US products, the development group must complete all translation packages. To adhere to this requirement, the US ship date is often held up by 30 days. Exceptions are often made for double-byte character string (DCBS) packages and Right-to-Left packages, resulting in further delays.

The current NLS build process is a post-process condition. The development and build teams do not know a build will break (i.e., not execute correctly) until after the build has completed. When developers create new files in the English release, for example, they must also send them to the translation centers for translation. Sometimes these files are overlooked until late in the development cycle. These files are then expedited to the translation packages which often is a costly, confusing and major issue.

Some NLS processes utilize Configuration Management Version Control (CMVC) "file linking" for NLS support. Linking solves some initial seeding problems where sparse CMVC release trees existed. This method causes library control performance issues. In addition, some products are reaching the CMVC maximum limitation of 26 linked releases. This method also has problems when new files were created. File linking would need to be redone against all NLS releases. Additionally, the file linking method did not provide merge support.

Other processes solved the sparse tree problems by doing NLS builds in a serial fashion. First the English files are downloaded, and then the translated files are downloaded, overlaying the existing English files. This method by-passes the library control system to control the NLS builds. The English files merged into the NLS build are not recorded on the build machine making reproducible builds a difficult process.

Among the problems with current NLS is the fact that sparse tree support is not provided under CMVC. Sparse tree means only a subset of the total translatable files were translated. This results in the number of first language files being different from the number of second language files in a library. Creating an application from the second language files results in a break as not all the files required to build the application are present. Thus a merge process is required wherein the first language files not present in the second language block of files are merged with the second language files to create a combined target object. Additionally, MRI builds are not presently reproducible under CMVC. The delta build process is extremely complicated and the reaction to problems is post-build when it is even more difficult to solve.

Current NLS build processes usually by-pass library control features. English files are copied from the library control machine then overlaid by the NLS files. Problems occur when English files are updated. The English files remaining on the NLS build machine become downlevel and the ability to re-create the NLS build becomes very problematic.

It is therefore desirable to have a method and system to perform concurrent national language translation builds to eliminate the aforementioned problems of building NLV applications. It is also desirable to perform concurrent national language translation builds to prevent delays in completion and shipping of software packages to the consumer.

SUMMARY OF THE INVENTION

It is therefore one object of the present invention to provide an improved software application.

It is another object of the present invention to provide a method and system for facilitating translations during the build process of software applications on a data processing system.

It is yet another object of the present invention to provide a method and system for performing concurrent national language translation builds of software applications on a data processing system.

The foregoing objects are achieved as is now described. A method is disclosed to provide concurrent national language support builds in a second human language during development of a computer software in a first human language on a data processing system. This method includes first tracking all baselevel changes of said software in a first human language, then storing the baselevel changes in a library control database field. At some point, a report of said baselevel changes is generated including a list of all newly created or updated files in the first human language which have not been translated into the second human language and all translated files in the second human language which are downlevel. The report is analyzed to give a real-time status of build to a developer of said computer software. The report permits the builder to decide whether or not to send the downlevel second language files to a national language center for translation.

In the preferred embodiment of the present invention, the invention first creates a baselevel field in a configuration management version control (CMVC) system with a library control database field. The baselevel field permits a baselevel value to be entered corresponding to the baselevel of a file of the computer software. All the files of the software are logged in the library control database field along with a corresponding CMVC version identification (VID) and related baselevel. During implementation, the files are extracted from the library utilizing a tool which creates a control file for each new update of a software and marks the control file with the proper information for the baselevel of the file extracted based on the baselevel of the file in said first language. When a file is submitted to a translation center and returned, its baselevel is automatically updated in the library control data base by the control file.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
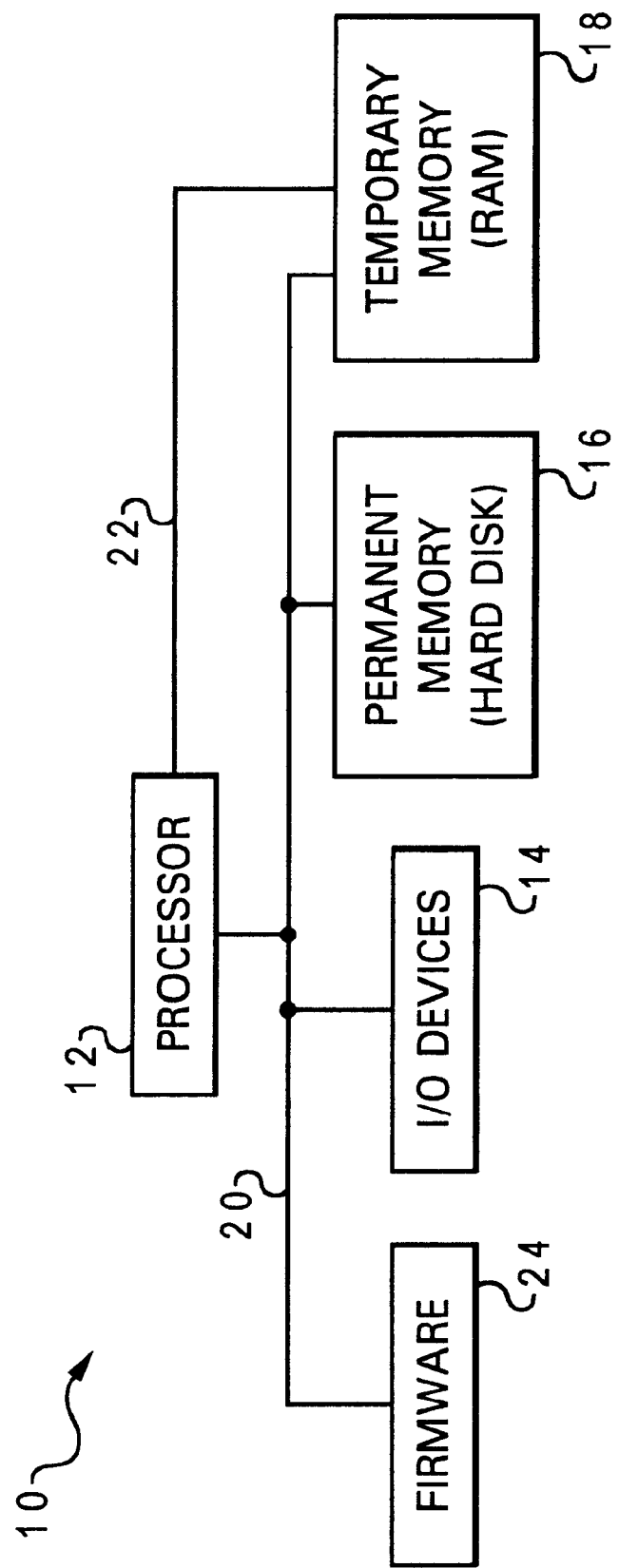
FIG. 1 is a block diagram depicting a data processing system utilized in accordance with the preferred embodiment of the present invention.

With reference now to the figures and in particular with reference to FIG. 1, there is depicted the basic structure of a conventional data processing system 10 utilized in the preferred embodiment of the invention. Data processing system 10 has at least one central processing unit (CPU) or processor 12 which is connected to several peripheral devices, including input/output devices 14 (such as a display monitor, keyboard, and graphical pointing device) for user interface, a permanent memory device 16 (such as a hard disk) for storing the data processing system's operating system and user programs/applications, and a temporary memory device 18 (such as random access memory or RAM) that is utilized by processor 12 to implement program instructions. Processor 12 communicates with the peripheral devices by various means, including a bus 20 or a direct channel 22 (more than one bus may be provided utilizing a bus bridge). Data processing system 10 may also include firmware 24 connected to the other components of the system.

Data processing system 10 may have many additional components which are not shown such as serial, parallel, and Universal Serial Bus (USB) ports for connection to, e.g., modems or printers. The invention is software implemented in a program integrated information (PII) tool in the preferred embodiment. Data processing system hard-drive is loaded with the software application containing the PII tool which is utilized to implement the invention. PII tool manages national language text for native language translations. It replaces machine readable information (MRI) which is program information that is translated.

PII tool provides a method to perform concurrent national language translation builds. In the preferred embodiment, PII tool is a build-tree merge tool which provides a method that allows the development team to perform concurrent builds on all the NLS build releases at any time during the development cycle. The invention also allows the development and build teams to discover NLS problems early in the product cycle. In the preferred embodiment, the invention provides library control "sparse" merge tree support.

Reports are generated during the implementation of the invention which are utilized to fix problems before actually starting the build "pre-build condition." These reports list all translated files that are downlevel, and lists newly created first human language files which have not yet been translated. The invention further provides real time NLS status for all interested groups which allows a concurrent NLS build process in the preferred embodiment. Finally, in the preferred embodiment, PII tool creates blueprint reports utilized for NLS build recreate ability.

PII tool utilizes library control features to implement the invention. It expands the configuration management version control (CMVC) to include a baselevel field. It utilizes an available field of database to hold a file translation tracking tag. In the preferred embodiment, this tag is referred to as the "baselvl" field. This library control database field is utilized to track all changes to the language source file that would require a translation. Those skilled in the art are familiar with CMVC and its applications.

Utilizing the "baselvl" field, the tool determines if a translated file is downlevel compared to the equivalent language file, for example, an English file. The PII tool creates various reports and "file extract" commands. These reports and command files are based off of the information stored in the "baselvl" database field.

PII tool consists of several executable files including "showbrk.cmd" and Piifile.cmd. In the preferred embodiment, these files are written in REXX programming language. Those skilled in the art appreciate that any comparable programming language may be utilized to create these files.

In the preferred embodiment, PII tool supports all language packages including double-byte character string (DECS), single-byte character strings (SBCS) and Right-to-left packages.

The output of the invention is presented on a Graphical User Interface (GUI). In the preferred embodiment, the settings of a basic CMVC file are adjusted so that the "baselvl" field is displayed. Those skilled in the art will appreciate the configurations of and the process involved in adjusting the settings of a CMVC file. In one embodiment of the invention, the GUI interface does not update the "baselvl" field automatically and the command line tool "piifile" is utilized to update a file's "baselvl".

In the preferred embodiment, CMVC "piifile" tool is utilized to perform functions on files that have changes that require updates to the baselvl field. This tool keeps the "baselvl" fields correct.

The PII tool fixes current build problems such as "file linking" and increases productivity in the NLS process. The file linking method is no longer required. In the preferred embodiment, the PII tool records each file's library control version utilized for a build. Recording the versions helps solve the problem of having to recreate older builds. Developers need only to update files in the release of the development language, such as English. They no longer have to ensure the file is seeded in all the NLS releases.

In the preferred embodiment, the tool is utilized by developers, build captains and PII coordinators. Developers utilize reports to debug translated build breaks and determine estimates of changed PII files. The tool also provides them the ability to build most current PII files.

Build Captains review translated builds before starting builds. The tool provides them with the ability to blueprint PII builds and increase build repeatability. PII Coordinators utilize the tool to estimate and manage PII file changes and to help control sparse CMVC releases.

To run the application the following code is utilized:

| CMVC family: | os2 |
| --- | --- |
| releases: | c.piitool.en, c.piiitool.fr |
| comp: | nls |

The SHOWBRK algorithm controls most of the processing of the invention and thus makes up an integral component of the PII tool. In the preferred embodiment, its syntax is as follows:

```
showbrk - brel<base_release>-xrel<translation_release>
- path <n:\mypath>
[-relpath<n:\extract_path>]
[-force YES|NO n:\path\force_file]
```

| | |
| --- | --- |
| -brel <base_release> | Required, CMVC English release |
| -xrel <translation_release> | Required, CMVC translation release |
| -path <n:\mypath> | Required, Valid drive and path |
| -FAMILY <CMVC FAMILY> | REQUIRED, DEFAULT IS CMVC_FAMILY ENVIRONMENT |
| -force <YES|NO> | Optional, Default is no. |
| -relpath <CMVC relative path> | Optional, Default is -path. |
| -blevel <base CMVC level > | Optional, Default is current CMVC version |
| -xlevel <translation CMVC level> | Optional, Default is current CMVC version |
| -mode <full|delta> | Optional, Default is full (Future use) |

The above algorithm when implemented provides a plurality of output files including BLDEXT.CMD, BLDSPC.CMD, SHOWBRK.MAT, and SHOWBLD.RPT.

BLDEXT.CMD performs the CMVC extracts utilizing a command file which is similar to SHOWBLD.RPT, but in ".CMD" format. BLDSPC.CMD extracts only the mismatch files and error files. This file is a subset of "BLDEXT.CMD" and is a special request for Aurora and Lan Migration.

SHOWBRK.MAT shows the file delta mismatches and error report (contains Xlate to US mismatches and error report). The SHOWBRK.MAT report is utilized before performing a build to review if potential build breaks exists. In the preferred embodiment, this report is generated by the showbrk tool if the "baselvl" fields are mismatched, the translated "baselvl" is greater than the first human language level, or a new file exists in the first human language release, but not in the translated release. This report is also generated if any of the user's "force" files were not found in the extract file (BLDEXT.CMD). An illustration of a mismatched report, errors report and new file create report follows:

| BaseLvl | XlateLvl | Release | Comp | Vid | Path Name |
| --- | --- | --- | --- | --- | --- |
| Mismatch Report | | | | | |
| 26 | 25 | c.piitool.fr | nls | 1.1 | mri/fr/aaaa.txt * |
| 28 | 22 | c.piitool.fr | nls | 1.1 | mri/fr/zzzz.acs ** |
| 2 mismatches found | | | | | |
| Errors Report | | | | | |
| | 12 | c.piitool.fr | nls | 1.1 | mri/fr/nnnn.dlg *** |
| 1 error(s) found | | | | | |

-continued

| English BaseLvl New File Create Report | Last Updated | Release | Comp | Current Version | Path Name |
| --- | --- | --- | --- | --- | --- |
| 1 | 1998/05/11 | c.piitool.en | nls | 1.1 | mri/en/dddd.rc |

Explanation
* US file is "baseLvl" 26, French "baseLvl" is 25 = mismatch
** US file is "baseLvl" 28, French "baseLvl" is 22 = mismatch
*** Error condition - translation "baseLvl" is greater than "baselevel", which is an invalid condition.

SHOWBLD.RPT shows what files will be pulled from CMVC (contains build report/blueprint/extract information). In the preferred embodiment, the SHOWBLD.RPT is generated when the SHOWBRK tool is run. Further, in the preferred embodiment, the report parallels the CMVC build extract file named (BLDEXT.CMD). For example, for every line in the BLDEXT.CMD file, there's an equivalent line in SHOWBLD.RPT report. The SHOWBLD.RPT gives a detailed, readable report of the PII files that are targeted for the build. A user reviews this file to determine the reason a PII file was chosen from the first human language release or translated release.

The following illustration depicts a portion of a typical SHOWBLD.RPT file. In the illustrative embodiment, each line written to the file represents the file chosen for the build. The development language "baselvl" is in the far-left column. For the purposes of this and other illustrative example, the English language is utilized as the development language. The remaining columns pertain to the file chosen for the build.

Sample SHOWBLD.RPT

| English BaseLvl | NLS BaseLvl | Force Release | Current Version | Path Name | |
| --- | --- | --- | --- | --- | --- |
| 0 | 0 | c.piitool.fr | 1.7 | mri/fr/00000nls.acs | line1: |
| 11 | 11 | c.piitool.fr | 1.8 | mri/fr/lnls.acs | line2: |
| 26 | 25 | c.piitool.en | 1.1 | mri/en/aaaa.txt | line3: |
| | | c.piitool.fr | 1.1 | mri/fr/bbbb.txt | line4: |
| 16 | 967 | c.piitool.en | 1.1 | mri/en/cccc.txt | line5: |
| 1 | — | c.piitool.en | 1.1 | mri/en/dddd.rc | line6: |

In the illustrative embodiment, the columns represent the following:

English Baselvl represents the CMVC "baselvl" English file utilized to help determine the file choice for the build;

NLS Baselvl is the CMVC "baselvl" NLS translated file;

Force indicates if the file was forced. If so, then the yes character "Y" appears in this field. A file force means that the tool has found a file that is down-level, but the user requested the translated file;

Release gives the CMVC release name of the file chosen to build;

Current Version gives the CMVC version of the file being utilized; and

Path Name provides the CMVC source name of the file.

In the illustrative embodiment, each line of the SHOWBLD report has a corresponding line number. The SHOWBLD.RPT line numbers represent a particular report. Following is an explanation of each line number:

Line1: Translated file matches English file (0=0);
Line2: Translated file matches English file (11=11);
Line3: Translated file is down-level from English file (26>25);
Line4: Translated file matches English file (blank=blank);
Line4: Blanks or empty strings are equal to zero (blank=0);
Line5: Error—the translated file is greater than the English file (16<967); and
Line6: The dash in the "baselvl" field indicates that no translated file exists.

In the next illustrative embodiment, a merge report is created by the showbrk tool. The output file contains the merged report output of the release "c.piitool.en" and "c.piitool.fr." In this illustrative embodiment, the files merged is created utilizing a typical. CMVC query such as:

Report -general fileview -select "pathname, releasename, compname, nuversionSID, basevid" -where "releasename='c.piitool.en' and dropdate is null"

This yields the following output:
English files
. . . . . . . . . . . . . . . . . .
mri/en/aaaa.txt¦c.piitool.en¦nls¦1.1¦26*
mri/en/bbbb.txt¦c.piitool.en¦nls¦1.1¦12
mri/en/cccc.txt¦c.piitool.en¦nls¦1.1¦16
mri/en/dddd.rc¦c.piitool.en¦nls¦1.1¦
mri/en/eeee.rc¦c.piitool.en¦nls¦1.1¦
mri/en/ffff.rc¦c.piitool.en¦nls¦1.1¦
mri/en/gggg.rc¦c.piitool.en¦nls¦1.1¦
mri/en/hhhh.rc¦c.piitool.en¦nls¦1.1¦
mri/en/iiii.rc¦c.piitool.en¦nls¦1.1¦
mri/en/jjjj.rc¦c.piitool.en¦nls¦1.1¦
mri/en/kkkk.rc¦c.piitool.en¦nls¦1.1¦
mri/en/llll.dlg¦c.piitool.en¦nls¦1.1¦42
mri/en/mmmm.dlg¦c.piitool.en¦nls¦1.1¦43
mri/en/nnnn.dlg¦c.piitool.en¦nls¦1.1¦*
mri/en/wwww.acs¦c.piitool.en¦nls¦1.1¦22
mri/en/xxxx.acs¦c.piitool.en¦nls¦1.1¦22
mri/en/yyyy.acs¦c.piitool.en¦nls¦1.1¦22
mri/en/zzzz.acs¦c.piitool.en¦nls¦1.1¦28*
mri/en/zzzzmore.end¦c.piitool.en¦nls¦1.1¦
French files in a mocked sparse tree
. . . . . . . . . . . . . . . . . .
mri/fr/aaaa.txt¦c.piitool.fr¦nls¦1.1¦25*
mri/fr/bbbb.txt¦c.piitool.fr¦nls¦1.1¦12
mri/fr/cccc.txt¦c.piitool.fr¦nls¦1.1¦16
mri/fr/llll.dlg¦c.piitool.fr¦nls¦1.1¦42
mri/fr/mmmm.dlg¦c.piitool.fr¦nls¦1.1¦43
mri/fr/nnnn.dlg¦c.piitool.fr¦nls¦1.1¦12*
mri/fr/oooo.inp¦c.piitool.fr¦nls¦1.1¦22
mri/fr/pppp.inp¦c.piitool.fr¦nls¦1.1¦22
mri/fr/qqqq.inp¦c.piitool.fr¦nls¦1.1¦22
mri/fr/rrrr.inp¦c.piitool.fr¦nls¦1.1¦22
mri/fr/ssss.inp¦c.piitool.fr¦nls¦1.1¦22
mri/fr/tttt.inp¦c.piitool.fr¦nls¦1.1¦22
mri/fr/uuuu.inp¦c.piitool.fr¦nls¦1.1¦22
mri/fr/vvvv.inp¦c.piitool.fr¦nls¦1.1¦22
mri/fr/xxxx.acs¦c.piitool.fr¦nls¦1.1¦22
mri/fr/yyyy.acs¦c.piitool.fr¦nls¦1.1¦22
mri/fr/zzzz.acs¦c.piitool.fr¦nls¦1.1¦22*
mri/fr/zzzzlast.end¦c.piitool.fr¦nls¦1.1¦
mri/fr/wwww.acs¦c.piitool.fr¦nls¦1.1¦22

In the preferred embodiment, the "*" in the output shows where a mismatch or error occurred in the merge process.

In one illustrative embodiment, the PIIFILE Tool is utilized with the following command line: piifile -checkin src\itools\piitools\showbrk.cmd -release c.piitool.en -fam os2-defect #

In the preferred embodiment, if the PIIFILE does not know how to handle a CMVC function (for example, "-extract" and "-resolve" commands), then the commands are passed to the CMVC "file" command. A list of the CMVC functions handled in one embodiment of the "piifile" includes:

-checkin=>updates the "baselvl" field by one;
-create=>creates a default "baselvl of 1;
-undo=>backs out defect and decrements baselvl;
-verify=>check release to ensure valid baselvl fields exist;
-unbump=>reverse action of option "-modify";
-show=>displays fileview information plus shows entire baselvl field;
-modify=>updates the "baseLvl" field; and
-undo=>"piifile" will undo defect then decrement the "baseLvl" by one.

The "modify" function has some considerations in updating the baselvl field. In the preferred embodiment, the "-baselvl" option must exist; otherwise, piifile passes the command line to the CMVC "file" command with no changes. A "-baselvl" option with no value will set the file's "baselvl" field to zero. If a file has an existing "baselvl" field, then the existing "baselvl" field is incremented by one. Also in the preferred embodiment, the "-force" parameter is utilized when the user wants all files to be set to the value entered on the "-baselvl" regardless of existing values.

"Piifile" will accept files from Standard-In ("stdin") or the keyboard input in the same manner as the CMVC "file" command. In the preferred embodiment, the CMVC "file" command "stdin" switch is the "-" character. This switch must also be utilized with "piifile". For example, to read files from the file CHANGE.IN the syntax would be:

piifile -modify - -release c.piitool.en -family os2 -baselvl 6 -force<change.in

In the previous syntax, if a developer wanted to type files from the keyboard, the "<change.in>" is omitted and the file names are manually typed in. To close "stdin" after the name has been typed, the user enters <Ctrl-Z>.

In one embodiment of the present invention, where "piifile" doesn't recognize the CMVC function entered, "piifile" attempts to pass the command along to the CMVC "file" command for processing. If the user has chosen to use the standard in switch '-', "piifile" is unable to pass "stdin" handle to the CMVC "file" command and returns an error to the user.

In the preferred embodiment, a typical CMVC "baselvl" field format looks like this:

"4_1.20,3_1.8,2_1.5,1_1.1"

In the previous example the "baselvl" field contains four baselvl entries. Following is the format of one "baselvl" unit, for example: 4_1.20, where:
"4"="baselvl" value;
"_"=Separates the "baselvl" value from the CMVC version number;
"1.20"=The CMVC version control number (when the "baselvl" was recorded); and
","=Commas separate individual "baselvl" units.

Also in the preferred embodiment, the CMVC "baselvl" field specifications includes the following characteristics:
1. The latest "baselvl" value is at the head of the field. The example shows the current "baselvl" is "4";
2. The CMVC default value for the "baselvl" is a NULL string;

3. The "baselvl" field cannot be set with a NULL string;
4. Zero and NULL are both equal values, i.e., 0=" ";
5. The "baselvl" field is an alpha-numeric entry field;
6. Use the character "_" to separate baselvl value from CMVC version ID, with no whitespace;
7. The "baselvl" units need to be separated by commas. Leave no whitespaces;
8. New entries are always added to the head of the field;
9. If needed, oldest entries are scrolled from end of field to ensure room for newest "baselvl" unit;
10. The "baselvl" units cannot be removed from the middle of a field, only beginning or end units may be removed; and
11. The "baselvl" values must be integers.

The invention when implemented with SHOWBRK provides sparse tree support under CMVC. However, some files are not translated for all countries and some PII files do not have PII text. Further, MRI builds are reproducible utilizing the SHOWBRK blueprint file. The SHOWBRK tool also eliminates the complexity of delta builds. Most importantly, the invention provides that ability to identify and fix build problems prior to build entry (e.g., English MRI is newer than translated text). Additionally, the invention identifies MRI mismatched files and assists NLV planning by providing real-time PII reports during all phases of the project. Finally, it eliminates NLS linking performance issues.

The following illustrative example explains the user interface during the implementation of the invention. In this illustrative embodiment, the history of two files (FOO.C EN and FOO.C FR) is tracked as they proceed through a NLS build cycle:

| CMVC VID | FILE NAME | RELEASE | BASELVL |
|---|---|---|---|
| 1.1 | FOO.C | FR | 0 |
| 1.5 | FOO.C | EN | 15 |
| 1.6 | FOO.C | EN | 15 |
| 1.2 | FOO.C | FR | 15 |
| 1.10 | FOO.C | EN | 15 |

Initially, the French FOO.C file is at version identification (vid) 1.1. The "baselvl" field is blank. The English FOO.C file fields are: vid=1.5, "baselvl"=15. The French file "baselvl" field is downlevel which, in the preferred embodiment, indicates the file needs to be translated (France baselvl: 0<15 English baselvl).

The NLS group, utilizing a tool named PIISHIP, extracts this file (and others if needed). PIISHIP creates a control file for each shipment and marks the control file with the proper information for the "baselvl" of the FOO.C, which is based off the English file "baselvl"=15.

In the illustrative embodiment, a non-translation type correction was made to the English version of FOO.C moving the vid to 1.6. In the preferred embodiment, this correction and other such typical minor "typo" errors do not require a translation effort; hence, the baselvl of the EN FOO,C file stays at baselvl=15.

Once the PII package from France returns, the file is checked into CMVC. In the illustrative embodiment, the French FOO.C vid is now 1.2 and the tool PIISHIP changes the French "baselvl" field to the value stored in the PIISHIP CONTROL file to baselvl=15.

In the illustrative embodiment, the last entry in the table for the English FOO.C file shows the vid at 1.10. This shows that four more development deltas were applied to the EN FOO.C file, and none of those changes required a translation. Thus, in this illustrative embodiment, the "baselvl" field remains at 15.

Development deltas refer to the log of each file which represents an upgrade of a software application. During a standard development process hundreds of deltas may be developed. Only some of these delta involve changes which are important to national language builds. The invention is able to check the development deltas and extract the most recent deltas during its extraction stage. This greatly reduces the time required to check the files in the database. The previous methods would have to analyze all of the development deltas to complete such a determination.

Merging of releases is a next important aspect of the present invention. During the merging process, a file in the development language release is merged with a file in the target build language (eg. English with French.) A final run is made which results in a final report being generated which compares the two releases. The PII Tool examples below show how the tool merges releases.

| Case 1: Entry's from previous table: | | |
|---|---|---|
| vid=1.10 FOO.C | EN | baselvl=15 |
| vid=1.2 FOO.C | FR | baselvl=15 |

The following example shows how the tool makes decisions on the "baselvl" fields. In this illustrative embodiment, the file being evaluated is "release" FR FOO.C, baselvl=1.2. FR FOO.C baselvl is checked against the English baselvl.

| | |
|---|---|
| FR FOO.C baselvl=15 ---------> | EN FOO.C baselvl=15 |
| Evaluate: EN baselvl=15 "IS EQUAL TO" | FR baselvl=15 |
| Action: Extract French FOO.C | |

In this illustrative embodiment, the FR file is utilized because it is the same "baselvl" as the English file. This means the FR file will not cause a build break.

Another illustrative example is presented below.

| Case 1A: | | |
|---|---|---|
| vid=1.10 | FOO.C EN | baselvl=36 |
| vid=1.2 | FOO.C FR | baselvl=15 |

In this illustrative embodiment, the evaluation results in baselvl's not being equal or matching. When this occurs, in the preferred embodiment, the English file is utilized because the FR baselvl is downlevel. This means the FR file could possibly cause a build break.

In the preferred embodiment, the vid's and "baselvl" fields are not entered or maintained by the user of the tool. The fields are automatically updated by the tool when the files are "checked in" to the library control system.

Figure 2:
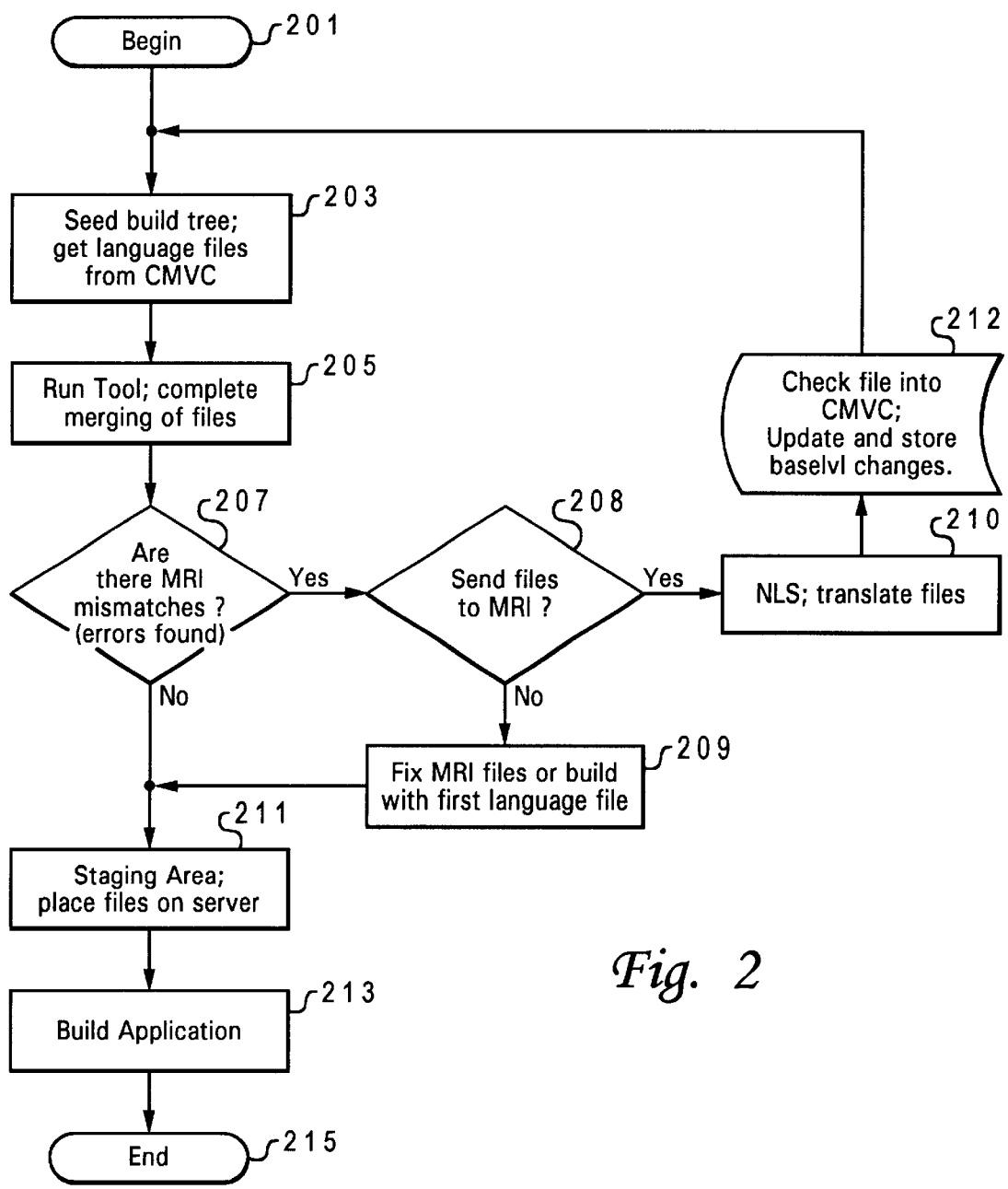
FIG. 2 is a flow chart depicting the general build process utilizing the tool in the prebuild phase in accordance with a preferred embodiment of the present invention.

Returning now to the figures, FIG. 2 depicts a flow chart of the build process in which one embodiment of this invention is implemented. The process begins (step 201) when the developer seeds the build tree (step 203). Seeding the build tree involves getting sets of files from language objects within CMVC. Files in the English version and the Japanese version of an application, for example, may be utilized. The tool is then run which completes the merging of files (step 205). In the preferred embodiment, running the tool requires running the BLDEXT.CMD algorithm and the BLDSPC.CMD algorithm. BLDEXT.CMD creates a superset of all combined files while BLDSPC.CMD creates a subset of the files which representing those files which require a translation. The features associated with the running of these algorithms are described above in detail. The tool then determines if there are MRI mismatches(errors) (step 207). This shows if there are potential breaks in the build due to files being downlevel and requiring translation. If there are MRI mismatches, then the tool permits the developer to determine whether or not to send the downlevel files to the MRI for translation (step 208). A developer may choose to do so and the files are sent to the NLS where they are translated (step 210). Once translated, the PIIFILE tool checks the file into CMVC which results in the files baselevel being automatically updated and stored (step 212). In the preferred embodiment, a control file monitors the files being sent for translations. When the file returns, the tool checks it into the CMVC and the control file gives the translated file the same baselevel as that of the first language file. A developer may decide not to send the files to MRI. In this case, the MRI files are fixed or the build is completed with the first language file (step 209). When this occurs or when there are no MRI mismatches, the files are then physically extracted and placed on a staging area or server (step 211). The staging area is a memory location or sever which may be overwritten with data and accessed by a build machine. In the preferred embodiment, the staging area is connected to the library system (CMCV) with a high speed wire. Although the above process has been shown to include decision steps, an alternative embodiment of the invention allows the process to be completed without external decision making. In such an embodiment, the process is fully dynamic and runs from (step 205) directly to (step 209).

In the preferred embodiment, the entire process occurs within the database and the tool conducts database queries and produces reports of all the files that fit a given criteria. No physical extraction occurs until the staging step in the process. The extract objects of the tool is a report of the extraction package which contains the combined language files. Developers may force a break by selecting files which are not latest versions. Further, the invention may be instantiated at any time without continuing on to a build stage. In FIG. 2 the process of continuing to the build stage is shown. Once the files are written on the staging area (step 211), they are then utilized to build the application (step 213) before the process terminates (step 215).

While the invention has been particularly shown and described with reference to a preferred embodiment, it will be understood by those skilled in the art that various changes in form and detail may be made therein without departing from the spirit and scope of the invention. For, example, while the invention has been describe with references to a single second human language, it is understood by those skilled in the art that the invention permits the updating of all language sets automatically.

What is claimed is:

1. A method to provide concurrent, national language support (NLS) builds in a second human language during development of a computer software in a first human language on a data processing system, said method comprising:

providing baselevel fields in a library control database system, wherein each of said baselevel fields contains a baselevel value linked to a file within said library control database system and corresponding to a developmental level of said file, wherein each file is tagged with its own baselevel;

tracking, via said baselevel value, changes to a file of said computer software in said first human language, wherein said baselevel value of said file is updated for each change to said file, which requires a translation for a counterpart file of said computer software in said second human language;

determining if changes made to any file in said first human language requires a translation effort, wherein a translation effort is required when a baselevel of a first file in said first human language is different from a baselevel of its counterpart second file in said second human language;

initiating a translation into said second human language of each first file in said first human language that has a different base level from its counterpart second file in a second human language, wherein said translating step provides an up-to-date version of said second file in said second human language; and automatically updating a baselevel value of each second file in said second human language for which an up-to-date version is provided to reflect a baselevel value of the first file in said first human language.

2. The method of claim 1, wherein said determining step further includes the steps of:

extracting said file from said library control database system; and creating a control file to log each file that is extracted and store its baselevel value; and generating reports including a first list of files in said first human language that have not been translated into said second human language and a second list of translated files in said second human language which each have a different baselevel value from its counterpart file in said first human language, wherein said reports are utilized to track which files are checked out of said library control database system.

3. The method of claim 2, wherein said determining step further includes the steps of:

comparing a first baselevel value of a first file in said first human language with a second baselevel value of a counterpart second file in said second human language; and when the first baselevel value and the second baselevel value are not equal,
visually representing to a user that the second file is downlevel, and
respectively adding said first file and said second counterpart file to said first list and said second list.

4. The method of claim 1, wherein said library control database system of said recording step includes a configuration management version control (CMVC) system.

5. The method of claim 2, wherein:

said generating step includes the step of merging a plurality of releases of said NLS files; and said tracking step includes the step of recording each of said changes with a new baselevel value for said file.

6. The method of claim 5, wherein said merging step further includes the steps of:

selecting from the library control database system a first set of files in said first human language-and a second set of files in said second human language; and creating a target object containing a combined set of files, wherein only one file is selected from among each file on said first list and its counterpart file on said second list.

7. The method of claim 6, wherein said creating step further includes the steps of:

comparing the baselevel value of a first file in said first human language with the baselevel value of a counterpart second file in said second human language; and extracting one of either said first file or said counterpart second file based on a result of said comparison, wherein said counterpart second file in said second language is only selected when the baselevel value of both said first and said second files are equal.

8. The method of claim 1, wherein said updating step includes the step of checking said up-to-date version of said second file in said second human language back into said library control database system, wherein each second file in said second human language within said library control database system that is provided an up-to-date version is replaced by its up-to-date version.

9. A system to provide concurrent national language support (NLS) builds in a second human language during development of a computer software in a first human language on a data processing system, said system comprising:

means for providing baselevel fields in a library control database system, wherein each of said baselevel fields contains a baselevel value linked to a file within said library control database system and corresponding to a developmental level of said file, wherein each file is tagged with its own baselevel;

means for tracking, via said baselevel value, changes to a file of said computer software in said first human language wherein said baselevel value of said file is updated for each change to said file, which requires a translation for a counterpart file of said computer software in said second human language;

means for determining if changes made to any file in said first human language requires a translation effort, wherein a translation effort is required when a baselevel of a first file in said first human language is different from a baselevel of its counterpart second file in said second human language;

means for initiating a translation into said second human language of each first file in said first human language that has a different base level from its counterpart second file in a second human language, wherein said translating step provides an up-to-date version of said second file in said second human language; and means for automatically updating a baselevel value of each second file in said second human language for which an up-to-date version is provided to reflect a baselevel value of the first file in said first human language.

10. The system of claim 9, wherein said determining means further includes:

means for extracting said file from said library control database system;

means for creating a control file to log each file that is extracted and store its baselevel value;

means for generating reports including a first list of files in said first human language that have not been translated into said second human language and a second list of translated files in said second human language which each have a different baselevel value from its counterpart file in said first human language, wherein said reports are utilized to track which files are checked out of said library control database system.

11. The system of claim 10, wherein said determining means further includes:

means for comparing a first baselevel value of a first file-in said first human language with a second baselevel value of a counterpart second file in said second human language; and when the first baselevel value and the second baselevel value are not equal, means for visually representing to a user that the second file is downlevel, and means for respectively adding said first file and said second counterpart file to said first list and said second list.

12. The system of claim 9, wherein said library control database system of said recording means includes a configuration management version control (CMVC) system.

13. The system of claim 10, wherein said generating means includes:

means for merging a plurality of releases of said NLS files; and said tracking means includes means for recording each of said changes with a new baselevel value for said file.

14. The system of claim 13, wherein said merging means further includes:

means for selecting from the library control database system a first set of files in said first human language and a second set of files in said second human language; and means for creating a target object containing a combined set of files, wherein only one file is selected from among each file on said first list and its counterpart file on said second list.

15. The system of claim 14, wherein said creating means further includes:

means for comparing the baselevel value of a first file in said first human language with the baselevel value of a counterpart second file in said second human language; and means for extracting one of either said first file or said counterpart second file based on a result of said comparison, wherein said counterpart second file in said second language is only selected when the baselevels value of both said first and said second files are equal.

16. The system of claim 9, wherein said updating means includes:

means for checking said up-to-date version of said second file in said second human language back into said library control database system, wherein each second file in said second human language within said library control database system that is provided an up-to-date version is replaced by its up-to-date version.

17. A computer program product to provide concurrent national language support (NLS) builds in a second human language during development of a computer software in a first human language on a data processing system, said program product comprising:

a storage medium;

program instructions on said storage medium for:

providing baselevel fields in a library control database system, wherein each of said baselevel fields contains a baselevel value linked to a file within said library control database system and corresponding to a developmental level of said file, wherein each file is tagged with its own baselevel;

tracking, via said baselevel value, changes to a file of said computer software in said first human language, wherein said baselevel value of said file is updated for each change to said file, which requires a translation for a counterpart file of said computer software in said second human language;

determining if changes made to any file in said first human language requires a translation effort, wherein a translation effort is required when a baselevel of a first file in said first human language is different from a baselevel of its counterpart second file in said second human language;

initiating a translation into said second human language of each first file in said first human language that has a different base level from its counterpart second file in a second human language, wherein said translating step provides an up-to-date version of said second file in said second human language; and automatically updating a baselevel value of each second file in said second human language for which an up-to-date version is provided to reflect a baselevel value of the first file in said first human language.

18. The computer program product of claim 17, further including program instructions for:

extracting said file from said library control database system; and creating a control file to log each file that is extracted and store its baselevel value; and generating reports including a first list of files in said first human language that have not been translated into said second human language and a second list of translated files in said second human language which each have a different baselevel value from its counterpart file in said first human language, wherein said reports are utilized to track which files are checked out of said library control database system.

19. The computer program product of claim 18, wherein said program instructions for said determining step further includes program instructions for:

comparing a first baselevel value of a first file in said first human language with a second baselevel value of a counterpart second file in said second human language; and when the first baselevel value and the second baselevel value are not equal,
visually representing to a user that the second file is downlevel, and
respectively adding said first file and said second counterpart file to said first list and said second list.

20. The computer program product of claim 17, wherein said library control database system of said recording step includes a configuration management version control (CMVC) system.

21. The computer program product of claim 18, wherein:

said program instructions for said generating step includes program instructions for merging a plurality of releases of said NLS files; and said program instructions for said tracking step includes instructions for recording each of said changes with a new baselevel value for said file.

22. The computer program product of claim 21, wherein said program instructions for said merging step further includes program instructions for:

selecting from the library control database system a first set of files in said first human language and a second set of files in said second human language; and creating a target object containing a combined set of files, wherein only one file is selected from among each file on said first list and its counterpart file on said second list.

23. The computer program product of claim 22, wherein said program instructions for said creating step further includes program instructions for:

comparing the baselevel value of a first file in said first human language with the baselevel value of a counterpart second file in said second human language; and extracting one of either said first file or said counterpart second file based on a result of said comparison, wherein said counterpart second file in said second language is only selected when the baselevel value of both said first and said second files are equal.

24. The computer program product of claim 17, wherein said program instructions for said updating step further includes program instructions for checking said up-to-date version of said second file in said second human language back into said library control database system, wherein each second file in said second human language within said library control database system that is provided an up-to-date version is replaced by its up-to-date version.

* * * * *

UNITED STATES PATENT AND TRADEMARK OFFICE
CERTIFICATE OF CORRECTION

PATENT NO. : 6,442,516 B1
DATED : August 27, 2002
INVENTOR(S) : Arimilli et al.

It is certified that error appears in the above-identified patent and that said Letters Patent is hereby corrected as shown below:

Column 4,
Line 33, please delete "(DECS)" and replace with -- (DBCS) --.

Column 13,
Line 49, please add -- and -- after ";".
Line 61, please delete "file-in said first human language with a second" and replace with -- file in said first human language with a second --.

Column 14,
Lines 32-33, please delete "baselevels value" and replace with -- baselevel value --.

Signed and Sealed this

Twenty-second Day of July, 2003

JAMES E. ROGAN
*Director of the United States Patent and Trademark Office*